United States Patent [19]
Morita

[11] Patent Number: 5,826,720
[45] Date of Patent: Oct. 27, 1998

[54] STORAGE CASE FOR MAGNETIC TAPE CASSETTE

[75] Inventor: Kiyoo Morita, Kanagawa, Japan

[73] Assignee: Fuji Photo Film Co., Ltd., Japan

[21] Appl. No.: 645,660

[22] Filed: May 14, 1996

[30] Foreign Application Priority Data

May 15, 1995 [JP] Japan ..................................... 7-138930

[51] Int. Cl.⁶ .................................................. B65D 85/67
[52] U.S. Cl. .................................. 206/387.1; 206/387.13; 206/474
[58] Field of Search .................................. 206/387.1, 307, 206/310, 311, 312, 387.13, 472, 474, 493

[56] References Cited

U.S. PATENT DOCUMENTS

| | | |
|---|---|---|
| 4,184,594 | 1/1980 | Hehn . |
| 4,231,474 | 11/1980 | Takahashi ........................... 206/387.13 |
| 4,291,801 | 9/1981 | Basili et al. ............................... 206/493 |
| 4,365,711 | 12/1982 | Long et al. .......................... 206/387.13 |
| 4,593,814 | 6/1986 | Hagiwara et al. .................... 206/387.1 |
| 4,614,269 | 9/1986 | Deitze et al. . |
| 4,871,064 | 10/1989 | Hehn et al. .......................... 206/387.13 |
| 4,928,825 | 5/1990 | Hehn ....................................... 206/307 |
| 4,981,211 | 1/1991 | Janek . |

FOREIGN PATENT DOCUMENTS

| | | |
|---|---|---|
| 2 563 505 | 4/1985 | France . |
| 30 27 024 A1 | 2/1982 | Germany . |
| 35 02 536 A1 | 8/1985 | Germany . |
| 59082671 | 5/1984 | Japan . |
| 406100071 | 4/1994 | Japan ............................... 206/387.13 |

OTHER PUBLICATIONS

European Search Report.

*Primary Examiner*—Paul T. Sewell
*Assistant Examiner*—Luan K. Bui
*Attorney, Agent, or Firm*—Brinks Hofer Gilson & Lione

[57] ABSTRACT

In a storage case for a magnetic tape cassette providing a case main body, a pair of openings with rims formed on a bottom of the casing for rotary shaft insertion, a pair of tape reels each positioned rotatably around the respective openings and a pair of annular ribs each formed on a bottom of one of the tape reels, the storage case provides a case main body including a bottom plate and a peripheral wall projecting on the bottom plate to form a case storage space, a closure member including a top plate covering a top of the case main body and walls projecting on the top plate and overlapping the wall, a joining member with a hinge for joining the case main body and the closure member which are opened and closed freely to store the magnetic tape cassette in the case storage space, and a pair of projections formed on the bottom plate, each of the projections being capable of entering between one of the rims and respective one of the annular ribs and locking the casing and the tape reels of the magnetic tape cassette. The storage case can prevent the casing and the tape reels from clattering, and smoothly store and take out the magnetic tape cassette.

11 Claims, 5 Drawing Sheets

STORAGE CASE FOR MAGNETIC TAPE CASSETTE

BACKGROUND OF THE INVENTION

The present invention relates to a storage case for a magnetic tape cassette in which the storage case includes a case main body and a closure member covering the top of the case main body which open and close freely relative to each other by a hinge joint.

Figure 10:
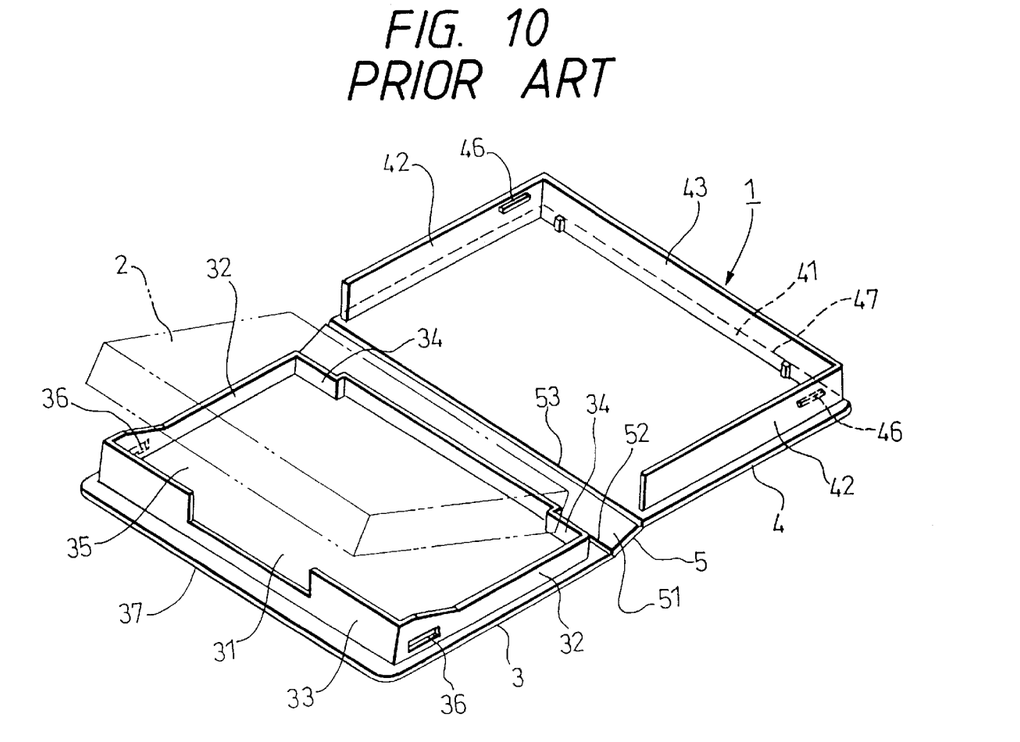
FIG. 10 is a perspective view of a conventional storage case for a magnetic tape cassette in the state where a closure member is open.
Figure 11:
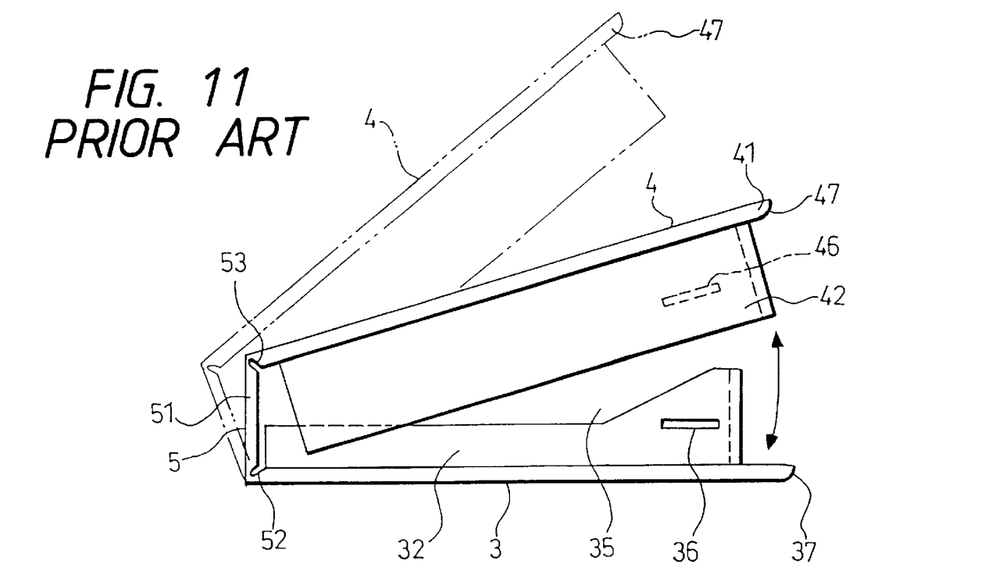
FIG. 11 is a sectional view showing the opening and closing actions of the conventional storage case.

Conventionally, there have been various types of storage cases for encasing magnetic tape cassettes, such as video tape cassettes. FIGS. 10 and 11 show an example of conventional storage cases. A storage case 1 in the figures is utilized for encasing a magnetic tape cassette 2 of a substantially rectangular parallelepiped shape. The storage case includes a case main body 3, a closure member 4 and a joining member 5 which joins the closure member 4 and the case main body 3 through hinges 52 and 53 so as to open and close freely and are integrally formed of synthetic resin in a single body.

The case main body 3 includes a bottom plate 31, right and left side walls 32, 32 which project on both side edges of such bottom plate 31 perpendicularly to the plate 31, a front wall 33 which projects on the front edge of the bottom plate 31 perpendicularly to the plate 31, and a rear wall 34 which projects on the rear edge of the bottom plate 31 perpendicularly to the plate 31. The case main body 3 has a tape storage space 35 which opens the top of the case main body 3.

The closure member 4 includes a top plate 41 which covers the top of the case main body 3, right and left side walls 42, 42 which project on both side edges of the top plate 41 perpendicularly to the plate 41 and overlap with the right and left walls 32, 32 of the case main body 3, and a front wall 43 which projects on the front edge of the top plate 41 perpendicularly to the plate 41 and overlaps with the front wall 33 of the case main body 3.

The joining member 5 joins the bottom edge of the joint plate 51 and the rear edge of the bottom plate 31 of the case main body 3 through a hinge 52 and also joins a top edge of the joint plate 51 and a rear edge of the top plate 41 of the closure member 4 through a hinge 53. The top and bottom edges of the joint plate 51 are thinned and function as the hinge 52 and 53. That is, the joining member 5 has an arrangement where the bottom edge of the joint plate 51 is hinged with the rear edge of the bottom plate 31 while the top edge of the joint plate 51 is hinged with the rear edge of the top plate 41.

When the magnetic tape cassette 2 is stored in the storage case 1 of this arrangement, as shown by two-dotted lines in FIG. 10, the case main body 3 and the closure member 4 are opened wide and then the closure member 4 is closed after the magnetic tape cassette 2 is inserted in the tape storage space 35 of the case main body 3. In this case, the magnetic tape cassette 2 is stored in the tape storage space 35 in such a manner that the peripheral walls of the magnetic tape cassette 2 are surrounded by the right and left side walls 32, 32, the front wall 33 and the rear wall 34 of the case main body 3. As shown in FIG. 11, engaging projections 46, 46 are formed, for example, on the inner surface of the right and left side walls 42, 42 of the closure member 4 of this type of storage case 1. The engaging projections 46, 46 are fitted into engagement grooves 36, 36 formed on outer surfaces of the right and left side walls 32, 32 when the closure member 4 is closed, thereby locking the case main body 3 and the closure member 4 in closed position. Thus the closure member 4 is maintained in the closed state by fitting these engagement grooves 36, 36 and the engaging projections 46, 46 to each other.

When the magnetic tape cassette 2 is taken out of the storage case 1, the fitting of the engagement grooves 36, 36 and the engaging projections 46, 46 is released to open the closure member 4 by pulling up the closure member 4 with fingers respectively positioned at a front edge 37 of the bottom plate 31 of the case main body 3 and a front edge 47 of the top plate 41 of the closure member 4.

The above-described storage case 1 is desired that the magnetic tape 2 is stored steadily without space for clattering movement. This is achieved by designing the dimensions of the area surrounded by the right and left side walls 32, 32, and the front and real walls 33 and 34 close to the peripheral walls of the magnetic tape cassette 2 so as to minimize the clearance between them when stored. On the other hand, there arises a problem that reduction in the clearance increases difficulty in insertion and removal of the cassette.

On the contrary, a storage case having a pair of projections formed on an inner surface of the bottom plate has been proposed where the storage case is capable of preventing the tape reels for winding up the magnetic tape stored in the magnetic tape cassette 2 from clattering. Each of the projections is formed on the bottom plate of the case main body in correspondence to the pair of tape reels. When the magnetic tape cassette is stored in the storage case, each of the projections is fitted into driving openings of the tape reels, respectively. Therefore, the tape reels are prevented from clattering.

However, even in the case of the storage case of this type, some space permissible for the clattering movement may be generated due to relative migration of the tape reels and a casing for housing the tape reels if the casing of the magnetic tape cassette 2 is not steadily secured in the storage case. If reduction of space for the clattering movement at the time of storage is tried to be achieved by minimizing the clearance between the walls of the case main body and the peripheral walls of the cassette in such a case as above where the projections for the locking of the tape reels are formed, another problem arises that the relatively high projections causes extreme operational inefficiency in the insertion and removal of the cassette.

No conventional storage arrangement has been successful in simultaneous realization of locking both the casing and the tape reels of the cassette accompanied with operational efficiency in the insertion and removal of the cassette.

SUMMARY OF THE INVENTION

Therefore, an object of the present invention is to provide a magnetic tape cassette storage case which simultaneously prevents both the casing and the tape reels of the magnetic tape cassette from clattering and which is also excellent in operational efficiency in the insertion and removal of the cassette.

The above-described and other objects of the invention can be achieved by a storage case for encasing a magnetic tape cassette comprising a casing for housing a pair of tape reels having a pair of openings with rims formed on a bottom of the casing for rotary driving shaft insertion, a pair of tape reels each positioned rotatably around the respective openings and a pair of annular ribs each formed on a bottom of one of the tape reels, in which the storage case provides a case main body including a bottom plate and a first wall projecting perpendicular to the bottom plate to form a space for storing the cassette, a closure member including a top plate covering a top of the case main body and a second wall projecting perpendicular to the top plate and overlapping the first wall, a joining member with a hinge for joining the case main body and the closure member which can be opened and closed freely to encase the magnetic tape cassette in the case storage space, and a pair of projections formed on the bottom plate, each of the projections being capable of entering between one of the rims formed on the bottom of the casing and respective one of the annular ribs formed on the one of the bottom of the tape reels and locking the casing and the tape reels.

A preferred aspect of the present invention has an arrangement where the projections are formed in an annular configuration, an arrangement where the projections are a plurality of arc projections than one or an arrangement where the projections are a plurality of dot-shape projections arranged along the circumferential line.

An alternative preferred aspect of the present invention has an arrangement where tapered guide surfaces are formed on at least one pair of engagement parts of either the rims of openings for rotary shaft insertion or the annular ribs on the bottom of the tape reels or the projections formed on the bottom plate of the storage case.

Another alternative preferred aspect of the present invention has an arrangement where the projections are formed in such positions that a guard panel for the opening and closing of a front side of the casing of the cassette contacts a rear wall formed on the bottom plate.

In the magnetic tape cassette storage case according to the present invention, the projections of which edges on one side come to be engaged with the rims of the rotary shaft insertion openings formed on the bottom of the casing of the cassette while the edges on the other side come to be engaged with the annular ribs formed on the bottom surface of the tape reels when the magnetic tape cassette is stored are formed on the magnetic tape cassette storage case. That is, the projections enter between the rims of the openings in the casing and the annular ribs of the tape reels so as to simultaneously lock the casing and the tape reels of the cassette.

Since the projections are constructed so as to come to contact with both the annular ribs of the tape reels and the opening rims of the casing while placed between the both, the height of the projections are designed low. Therefore, the projections does not hinder the operations to insert the magnetic tape cassette into the case main body.

In t he magnetic tape cassette storage case according to the present invention, tapered guide surfaces are formed on at least one pair of mutual engagement parts of either the rims of openings in the casing or the annular ribs of the tape reels or the projections of the storage case. Since the projections are guided toward between the annular ribs of the tape reels and the rims of the openings in the casing, the projections thus smoothly enters between the annular ribs and the opening rims at the time of insertion of the magnetic tape cassette.

In the magnetic tape cassette storage case according to the present invention, the guard panel of the casing is secured by the wall of the case main body which comes into contact with at the time of storing the magnetic tape cassette if the projections are formed in such positions that the guard panel for the opening and closing the front of the casing contacts with the wall formed on the bottom plate.

DETAILED DESCRIPTION OF THE PREFERRED EMBODIMENTS

Description will be given below in detail of embodiments according to the present invention with reference to the accompanying drawings.

Figure 1:
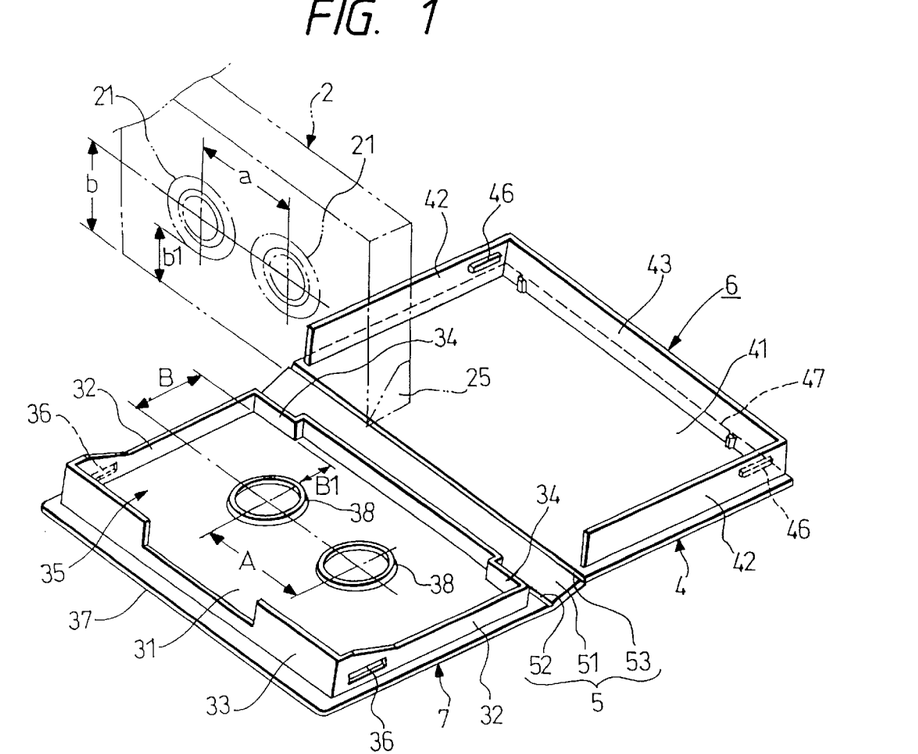
FIG. 1 i a perspective view of a storage case for a magnetic tape cassette according to a first embodiment of the present invention in the state where a closure member is open.
Figure 2:
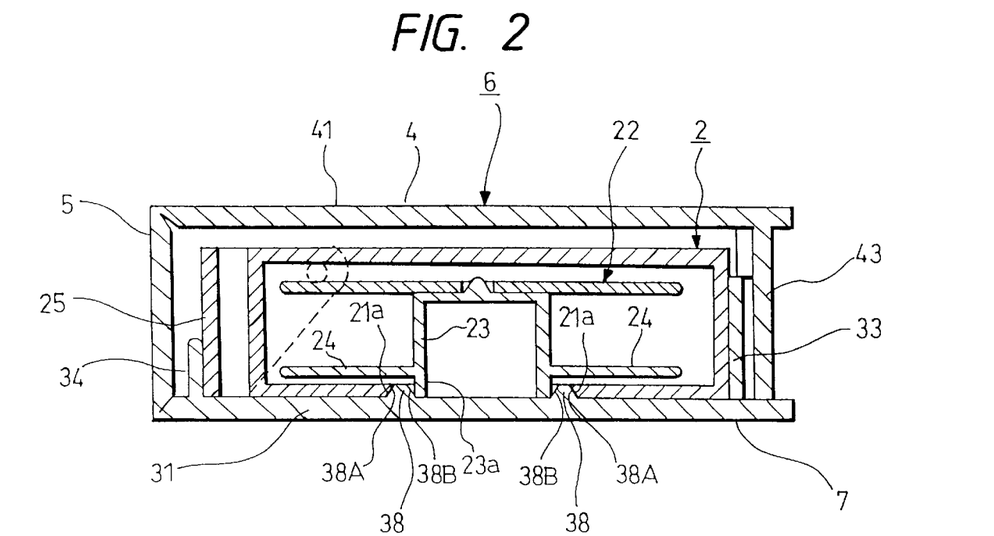
FIG. 2 is a sectional view showing the storage case according to the first embodiment in the state where a magnetic tape cassette is stored.

The following paragraphs describe in detail a first embodiment of the magnetic tape cassette storage case according to the present invention with reference to FIGS. 1 and 2.

A storage case 6 is utilized for encasing a magnetic tape cassette 2 of a substantially rectangular parallelepiped shape. The storage case 6 includes a case main body 7, a closure member 4 and a joining member 5 which are integrally formed of synthetic resin in a single body. The joining member 5 joins the closure member 4 and the case main body 7 which are opened and closed freely to each other. The case main body 7 has the same arrangement as the case main body 3 in FIG. 10 except that annular projections 38 are formed on a bottom plate 31 as described below. The closure member 4 and the joining member 5 have exactly the same arrangement as those in FIG. 10.

That is, the case main body 7 includes the bottom plate 31, right and left side walls 32, 32 which project on both side edges of the bottom plate 31 perpendicularly to the plate 31, a front wall 33 which projects on the front edge of the bottom plate 31 perpendicular thereto and rear walls 34 which projects on the rear edge of the bottom plate 31 perpendicular thereto. The bottom plate 31 and the side walls 32, 32, 33 and 34 form a tape storage space 35 having a top which is opened.

Substantially in the center of the bottom plate 31, the annular projections 38 described above are formed apart from each other by a distance A. The distance A is set up to be the same as the distance "a" between rotary shaft insertion openings 21 (hereinafter referred to simply as "openings") formed in the bottom of a casing of the magnetic tape cassette 2. As shown in FIG. 2, an outer cylindrical surface 38A and an inner cylindrical surface 38B are respectively tapered in such a manner that the thickness of each annular projection 38 is thinner toward the top. The outer cylindrical surface 38A engages with an opening rim 21aof the tapered surface which forms the opening 21 in the bottom of the casing of the magnetic tape cassette 2, and the inner cylindrical surface 38B engages with the outer cylindrical surface of annular rib 23a. The annular rib 23ais formed at the bottom edge of the winding core 23 of each of the tape reels 22 which are supported rotatably inside the casing of the magnetic tape cassette 2.

Therefore, when the magnetic tape cassette 2 is stored in the tape storage space 35, the annular projections 38 entering between the annular ribs 23a of the tape reels 22 and the opening rims 21a of the openings 21 formed in the bottom of the casing of the magnetic tape cassette 2 simultaneously lock the casing and the tape reels 22 of the magnetic tape cassette 2. The tape reels 22 are maintained in the position indicated in FIG. 2 by an urging force of leaf springs (not shown) provided in the casing of the cassette.

The height of the annular rib 38 is designed to be low enough to avoid contact with the flange 24 of the tape reel 22. The magnetic tape cassette 2 is thus stored in and taken out of the tape storage space 35 smoothly without being hindered by the annular projections 38 at the time of insertion and removal of the magnetic tape cassette 2.

As described above, since the outer cylindrical surface 38A and the inner cylindrical surface 38B are respectively tapered in such a manner that the thickness of the annular projection 38 is thinner toward the top, each projection 38 is smoothly guided to enter between the annular rib 23a of the tape reel 22 and the opening rim 21a of the casing when the magnetic tape cassette 2 is inserted.

Additionally, as shown in FIG. 1, the distance B between the annular projections 38 and the rear wall 34 is designed to be substantially the same as the distance b between the openings 21 in the magnetic tape cassette 2 and a guard panel 25 of the magnetic tape cassette 2 (as an alternative, the distance B1 may be designed to be substantially the same as the distance b1). Therefore, when the magnetic tape cassette 2 is stored in the tape storage space 35, the guard panel 25 for protecting the magnetic tape contacts the rear wall 34 (FIG. 2). The guard panel 25 is thus locked by the rear wall 34.

The closure member 4 has such an arrangement that is formed of a top plate 41 which covers the top of the case main body 7, right and left side walls 42, 42 which project on both side edges of the top plate 41 perpendicular thereto and overlap with the right and left side walls 32, 32, and a front wall 43 of the closure member 4 which projects on the front edge of the top plate 41 perpendicular thereto and overlaps with the front wall 33.

The joining member 5 joins the bottom edge of a joint plate 51 and the rear edge of the bottom plate 31 of the case main body 3 and also joins the top edge of the joint plate 51 and the rear edge of the top plate 41 of the closure member 4. The thickness of the top and bottom edges of the joint plate 51 are thinned and function as hinge parts 52 and 53. That is, the joining member 5 has an arrangement where the bottom edge of the joint plate 51 is hinged with the rear edge of the bottom plate 31 while the top edge of the joint plate 51 is hinged with the rear edge of the top plate 41.

When the magnetic tape cassette 2 is stored in the above-described cassette storage case 6 as shown in FIG. 1, the magnetic tape cassette 2 is inserted into the tape storage space 35 of the case main body 7 while the case main body 7 and the closure member 4 are opened wide. In this case, since the height of the annular ribs 38 is designed to be low enough to avoid contact with the flange 24 of the tape reel 22, the tape inserting operation is not hindered by the annular projections 38 and the magnetic tape cassette 2 is stored smoothly.

Furthermore, since the outer cylindrical surface 38A and the inner cylindrical surface 38B of the annular projections 38 are respectively tapered, each of the projections 38 is smoothly guided to enter between the annular rib 23a of the tape reel 22 and the opening rim 21aof the casing at the time of insertion of the magnetic tape cassette 2.

Although the inner cylindrical surface of the opening 21 in the bottom of the casing of the tape cassette 2 is tapered by being outward inclined from a view of the bottom while the annular projection 38 which projects on the bottom plate 31 is also tapered, tapering on either of the two can be eliminated. For example, when the magnetic tape cassette 2 where the inner cylindrical surface of the opening 21 in the bottom of the casing of the tape cassette is tapered, each of the projections 38 is smoothly guided to enter between the annular rib 23a and the opening 21 only by the tapering on the opening 21 without the tapering on the annular projection.

In this way, when each of the projections 38 enters between the annular rib 23a of each tape reel 22 and each opening rim 21a of the casing of the magnetic tape cassette 2, the outer cylindrical surface 38A of the annular projection 38 engages with an opening rim 21a of the tapered surface while the inner cylindrical surface 38B of the annular projection 38 engages with the outer cylindrical surface of the annular rib 23a. The annular projections 38 thus lock the casing and the tape reels 22 of the magnetic tape cassette 2, simultaneously.

Therefore, both the casing and the tape reels 22 of the magnetic tape cassette 2 stored in the case main body 7 are simultaneously prevented from clattering. Moreover, the guard panel 25 is also prevented from clattering since the guard panel 25 comes into contact with the rear wall 34 of the case main body 3.

On the other hand, even if there is some clearance between other peripheral side walls of the casing of the magnetic tape cassette 2 and the right and left side walls 32, 32 or the front wall 33, the casing of the cassette is positioned without space for the clattering movement inside the tape storage space 35.

In this state, the closure member 4 is closed to fully store the magnetic tape cassette 2 in the magnetic tape cassette storage case 6 without any clattering movement for the casing, the tape reels 22 and the guard panel 25 of the magnetic tape cassette 2.

As shown in FIG. 1, the engaging projections 46, 46 which fit the engagement grooves 36 formed on the right and left side walls 32, 32 when the closure member 4 is closed are formed on the inner surface of the right and left side wall plates 42, 42 of the closure member 4. The engagement grooves 36 and the engaging projections 46 are fitted to each other to thereby maintain the closure member 4 in the closed state without unintentional opening.

Now, in the case where the magnetic tape cassette 2 is taken out of the storage case 6, when the closure member 4 is pulled up with the fingers respectively placed on the front edge 37 of the bottom plate 31 of the case main body 7 and the front edge 47 of the top plate 41 of the closure member 4, the fitting of the engagement grooves 36 and the engaging projections 46 is disengaged to leave the closure member open. Then the magnetic tape cassette 2 is taken out of the tape storage space 35 in the case main body 7. In this case, the annular projections 38 the height of which is designed to be low enough not to hinder the operation to take it out. Since the magnetic tape cassette 2 is stored in the tape storage space 35 with adequate clearances to avoid contact with right and left side walls 32, 32 and the front wall 33, the magnetic tape cassette 2 is taken out smoothly.

Figure 3:
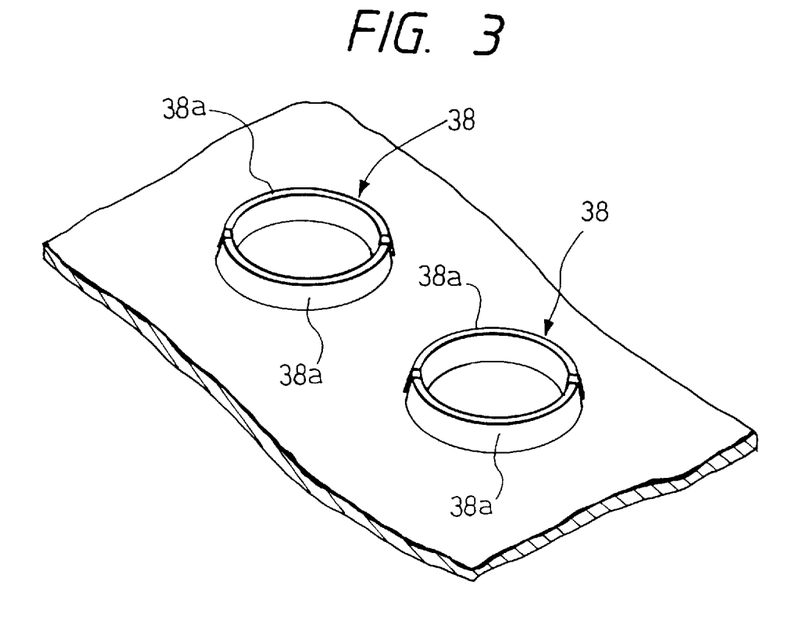
FIG. 3 is a perspective view showing a main part of a storage case according to a second embodiment of the present invention.
Figure 4:
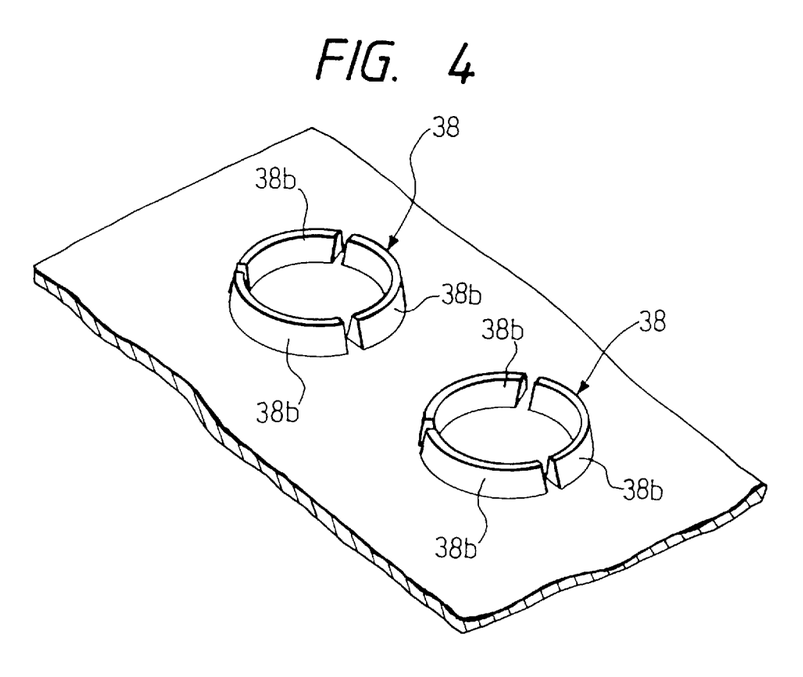
FIG. 4 is a perspective view showing a main part of a storage case according to a third embodiment of the present invention.
Figure 5:
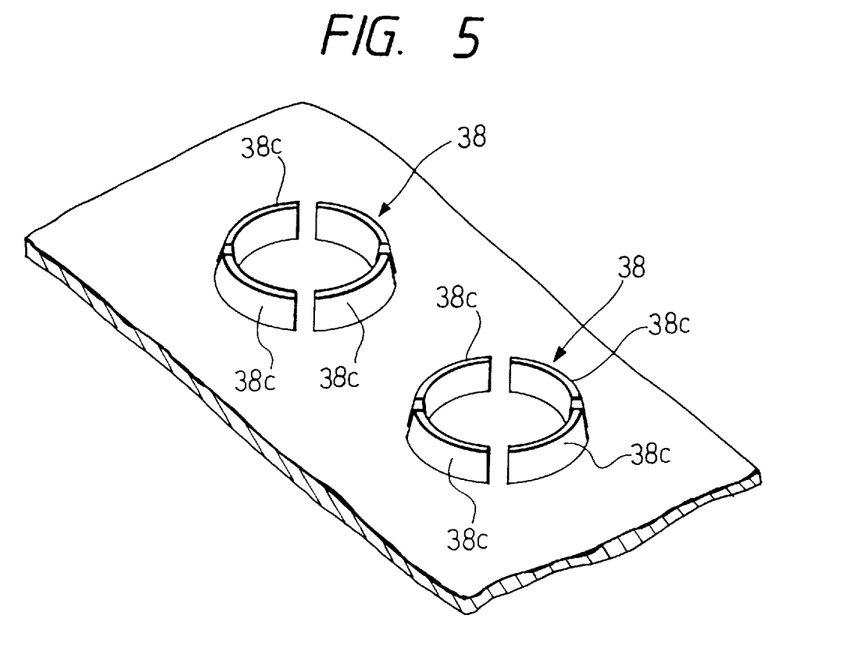
FIG. 5 is a perspective view showing a main part of a storage case according to a fourth embodiment of the present invention.
Figure 6:
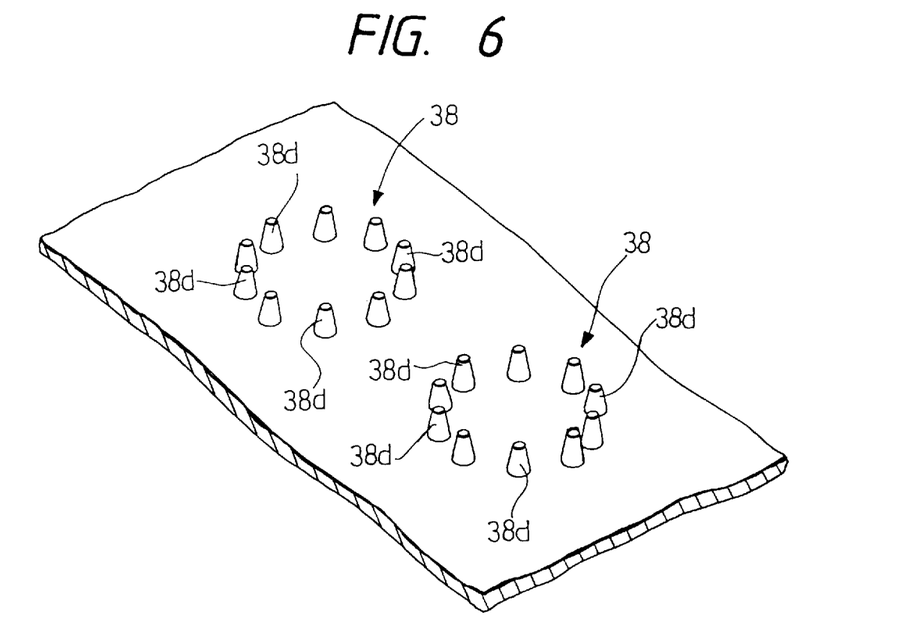
FIG. 6 is a perspective view showing a main part of a storage case according to a fifth embodiment of the present invention.

The first embodiment described above is provided with the projections 38 formed in an annular shape. Each of the projections 38 may be formed of two arc projections 38a serving as a second embodiment shown in FIG. 3. Each of the projections 38 may be formed of three arc projections 38b serving as a third embodiment shown in FIG. 4. Moreover, each of the projections 38 may be formed of four arc projections 38c serving as a fourth embodiment shown in FIG. 5. Furthermore, each of the projections 38 consisting of two or more dot projections 38d arranged along the circumferential line serving as a fifth embodiment shown in FIG. 6. The second to fifth embodiments can have the same effect as the first embodiment.

Figure 7:
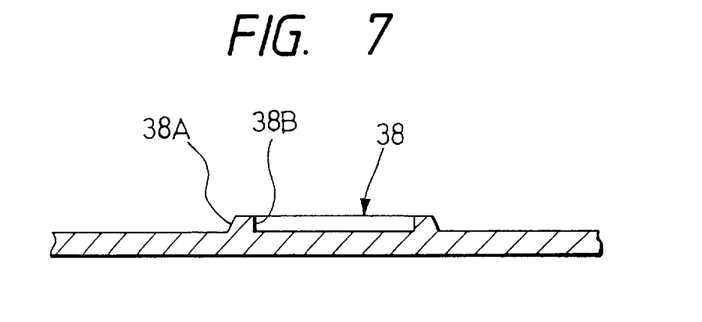
FIG. 7 is a sectional view showing a main part of a storage case according to a sixth embodiment of the present invention.
Figure 8:
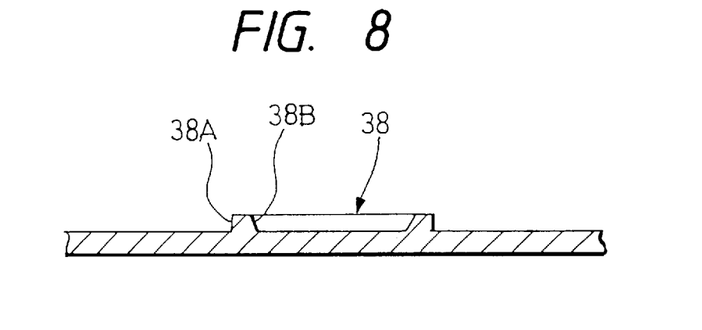
FIG. 8 is a sectional view showing a main part of a storage case according to a seventh embodiment of the present invention.

Besides the first embodiment showed in FIG. 2 where both the outer cylindrical surface 38A and the inner cylindrical surface 38B of each annular projection 38 are formed in a tapered shape, only the outer cylindrical surface 38A of each annular projection 38 may be formed in a tapered shape serving as a sixth embodiment shown in FIG. 7. Only the inner cylindrical surface 38B of each annular projection 38 may be formed in a tapered shape serving as a seventh embodiment shown in FIG. 8.

Figure 9:
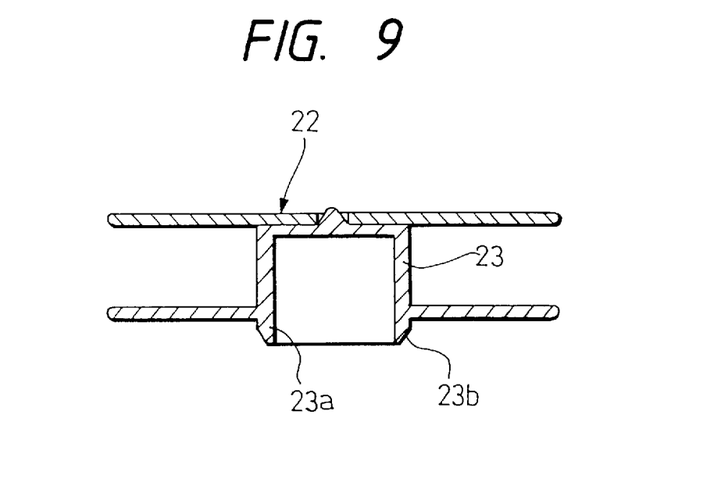
FIG. 9 is a sectional view showing a main part of a storage case according to an eighth embodiment of the present invention.

Although the first embodiment showed in FIG. 2 is described that the outer cylindrical surface of the annular rib 23a of the tape reel 22 is not formed in a tapered shape, the outer cylindrical surface 23b of the annular rib 23a of the tape reel 22 may be formed in a tapered shape serving as an eighth embodiment shown in FIG. 9. Furthermore, contrary to the outer cylindrical surface 23b described above, the inner cylindrical surface of the annular rib 23a may be formed in a tapered shape. Such arrangements as above facilitates guidance of the annular projection 38 into the space between the annular rib 23a of the tape reel 22 and the opening rim 21a of the casing of the magnetic tape cassette 2.

As described above, in the storage case for the magnetic tape cassette according to the present invention, since the projections of which edges on one side come to be engaged with the rims of the rotary shaft insertion openings formed on the bottom of the casing while the edges on the other side come to be engaged with the annular ribs formed on the bottom surface of the tape reels when the magnetic tape cassette is stored are formed on the magnetic tape cassette storage case, the projections enter between the rims of the openings in the casing and the annular ribs of the tape reels and simultaneously lock the casing and the tape reels of the magnetic tape cassette.

Additionally, since the projections are constructed so as to come to contact with both the annular ribs of the tape reels and the opening rims of the casing while placed between the both, the height of the projections are designed low, and thus the projections will not hinder the operations to insert the magnetic tape cassette into the case main body and the operational efficiency in inserting and removing the cassette is excellent.

Moreover, in the storage case for the magnetic tape cassette according to the present invention, where the tapered guide surfaces are formed on at least one pair of mutual engagement parts of either the rims of openings in the casing or the annular ribs of the tape reels or the projections, the operational efficiency in storing the cassette is also excellent with the projections smoothly entering between the annular ribs and the opening rims at the time of storing the magnetic tape cassette since the projections are guided toward between the annular ribs of the tape reels and the rims of the openings in the casing.

In the storage case for the magnetic tape cassette according to the present invention, the guard panel of the magnetic tape cassette is secured by the real wall of the case main body which comes into contact with at the time of storing the magnetic tape cassette if the projections are formed in such positions that the guard panel for the opening and closing of the front of the casing contacts the rear wall formed on the bottom plate of the case main body, and thus the guard panel is prevented from clattering effectively as well.

The above description is directed to the annular rib formed on the bottom of the tape reel which is of a single type. However, the storage case according to the present invention is also applicable to the magnetic tape cassette including tape reels each having two to four annular ribs which are formed on the bottom of the respective tape reels and arranged concentrically with each other (for example, a large-sized video cassette for business use, such as used in a broadcasting station).

In this case, annular projections formed on the bottom plate of the case main body are positioned so that the annular projections can enter between the opening rim of each opening formed in the bottom of the casing of the magnetic tape cassette and an annular rib having the largest diameter of the annular libs inside the opening.

What is claimed is:

1. A magnetic tape storage system comprising:
   a magnetic tape cassette having a casing for housing a pair of tape reels, a pair of openings with rims formed on a bottom of the casing, the pair of rotatable tape reels each positioned within the casing at a respective one of the openings, each of the tape reels having an annular rib formed on a bottom of the tape reel, each of the annular ribs and respective rim of the casing defining an annular groove;
   a storage case for storing the magnetic tape cassette, the storage case comprising:
   a main body including a bottom plate and a peripheral wall projecting perpendicularly from the top plate and overlapping at least part of the peripheral wall of the main body;
   a joining member with a hinge for joining the main body and the closure member whereby the main body and closure member are opened and closed freely to store the magnetic tape cassette in the space; and
   a pair of projections formed on the bottom plate, each projection positioned on the bottom plate to frictionally fit in a respective one of the annular grooves to prevent substantial relative movement of the magnetic tape cassette and the tape reels.

2. The storage case of claim 1, wherein each of the projections is formed in an annular shape.

3. The storage case of claim 1, wherein each of the projections is formed of not less than two dot projections arranged along a circumferential line.

4. The storage case of claim 3, wherein each of the projections is formed of not less than two dot projections arranged along a circumferential line.

5. The storage case of claim 1, wherein the case further contains the magnetic tape cassette in the space, and wherein at least one of the rims, the annular ribs and the projections includes a tapered guide surface for engagement.

6. The storage case of claim 5, wherein each of the projections if formed in annular shape.

7. The storage case of claim 5, wherein each of the projections is formed of not less than two arc projections.

8. The storage case of claim 5, wherein the peripheral wall of the case main body includes right and left side walls, a front wall which projects on a front edge opposite to a joining edge of the joining member on the bottom plate and a rear wall which projects on the bottom plate neat to the joining edge.

9. The storage case of claim 8, wherein a wall projecting on the top plate of the closure member includes right and left walls which projects on both sides of the top plate perpendicular thereto and a front wall which projects on a front edge opposite to the joining edge of the joining member on the top plate and extend perpendicular to the top plate.

10. The storage case of claim 9, wherein each of the right and left side walls of the case main body has an engaging projection of each of inner surfaces thereof, thereby locking the case main body and the closure member in closed state.

11. The storage case of claim 1, wherein each of said tape reels comprises a flange, and each of said projections is designed to be low enough to avoid contact with said flange of said tape reel.

* * * * *

UNITED STATES PATENT AND TRADEMARK OFFICE
CERTIFICATE OF CORRECTION

PATENT NO. : 5,826,720
DATED : October 27, 1998
INVENTOR(S) : Kiyoo Morita

It is certified that error appears in the above-identified patent and that said Letters Patent is hereby corrected as shown below:

Title page,
Column 1,
Line 6, under "U.S. PATENT DOCUMENTS", please change "Deitze" to -- Dietz --.

Claims
Change lines 12-15 to read as follows:
-- a main body including a bottom plate and a peripheral wall projecting perpendiculary from the bottom plate defining a space for receiving the magnetic tape cassette; -- and after this, add the following as a new subparagraph: -- closure member including a top plate covering a top of the main body and a wall projecting from the top plate and overlapping at least a part of the peripheral wall of the main body; --.

Claim 6,
Line 2, please change "if" to -- is --.

Claim 8,
Line 5, please change "neat" to -- near --.

Claim 9,
Line 3, please change "projects" to -- project --.

UNITED STATES PATENT AND TRADEMARK OFFICE
CERTIFICATE OF CORRECTION

PATENT NO. : 5,826,720
DATED : October 27, 1998
INVENTOR(S) : Kiyoo Morita

It is certified that error appears in the above-identified patent and that said Letters Patent is hereby corrected as shown below:

Claims (cont'd)
In claim 10, please change claim to read as follows:
-- The storage case of claim 9, wherein each of the right and left side walls of the case main body has an engagement groove on each of outer surfaces thereof and each of the right and left side walls of the enclosure member has an engaging projection on each of the inner surfaces thereof, thereby locking the case main body and the enclosure member in closed state. --

Signed and Sealed this

Fourteenth Day of August, 2001

*Attest:*

*Attesting Officer*

NICHOLAS P. GODICI
*Acting Director of the United States Patent and Trademark Office*